(12) United States Patent
Legge et al.

(10) Patent No.: US 7,005,606 B2
(45) Date of Patent: Feb. 28, 2006

(54) LASER MACHINE TOOL WITH IMAGE SENSOR FOR REGISTRATION OF WORKHEAD GUIDANCE SYSTEM

(75) Inventors: John C. Legge, Rockford, IL (US); Jimmy D. Berry, Winnebago, IL (US); Robert J. Farris, Rockton, IL (US)

(73) Assignee: W.A. Whitney Co., Rockford, IL (US)

( * ) Notice: Subject to any disclaimer, the term of this patent is extended or adjusted under 35 U.S.C. 154(b) by 90 days.

(21) Appl. No.: 10/658,162

(22) Filed: Sep. 9, 2003

(65) Prior Publication Data
US 2005/0051523 A1    Mar. 10, 2005

(51) Int. Cl.
*B23K 26/02* (2006.01)
(52) U.S. Cl. .............................. 219/121.83; 219/121.82
(58) Field of Classification Search ........... 219/121.83, 219/121.82, 121.63, 121.6
See application file for complete search history.

(56) References Cited

U.S. PATENT DOCUMENTS

| 5,132,510 | A |   | 7/1992 | Klingel et al. |
| 5,304,773 | A | * | 4/1994 | Kilian et al. ............ 219/121.78 |
| 5,751,436 | A | * | 5/1998 | Kwon et al. ............ 219/121.68 |
| 6,044,308 | A | * | 3/2000 | Huissoon .................... 700/166 |
| 6,204,473 | B1 | * | 3/2001 | Legge .................... 219/121.67 |

* cited by examiner

*Primary Examiner*—M. Alexandra Elve
(74) *Attorney, Agent, or Firm*—Leygig, Voit & Mayer, LTD

(57) ABSTRACT

A computer controlled laser machine tool is provided wherein the machine tool work zone is smaller than the size of the workpiece that can be processed. The machine tool has an apparatus to register the workhead guidance system to the workpiece without requiring a hole in the workpiece. The machine tool is adapted with an image sensor, a form of a digital camera, to measure the position of targets etched in or affixed to the surface of the workpiece. Registration of the workhead guidance system relative to the workpiece is checked before and after the workpiece support is indexed.

39 Claims, 13 Drawing Sheets

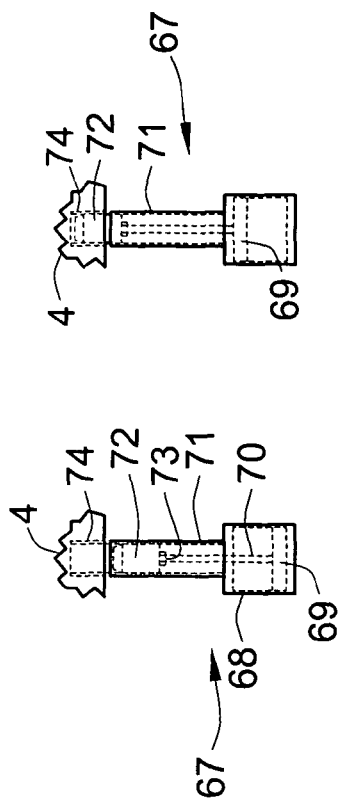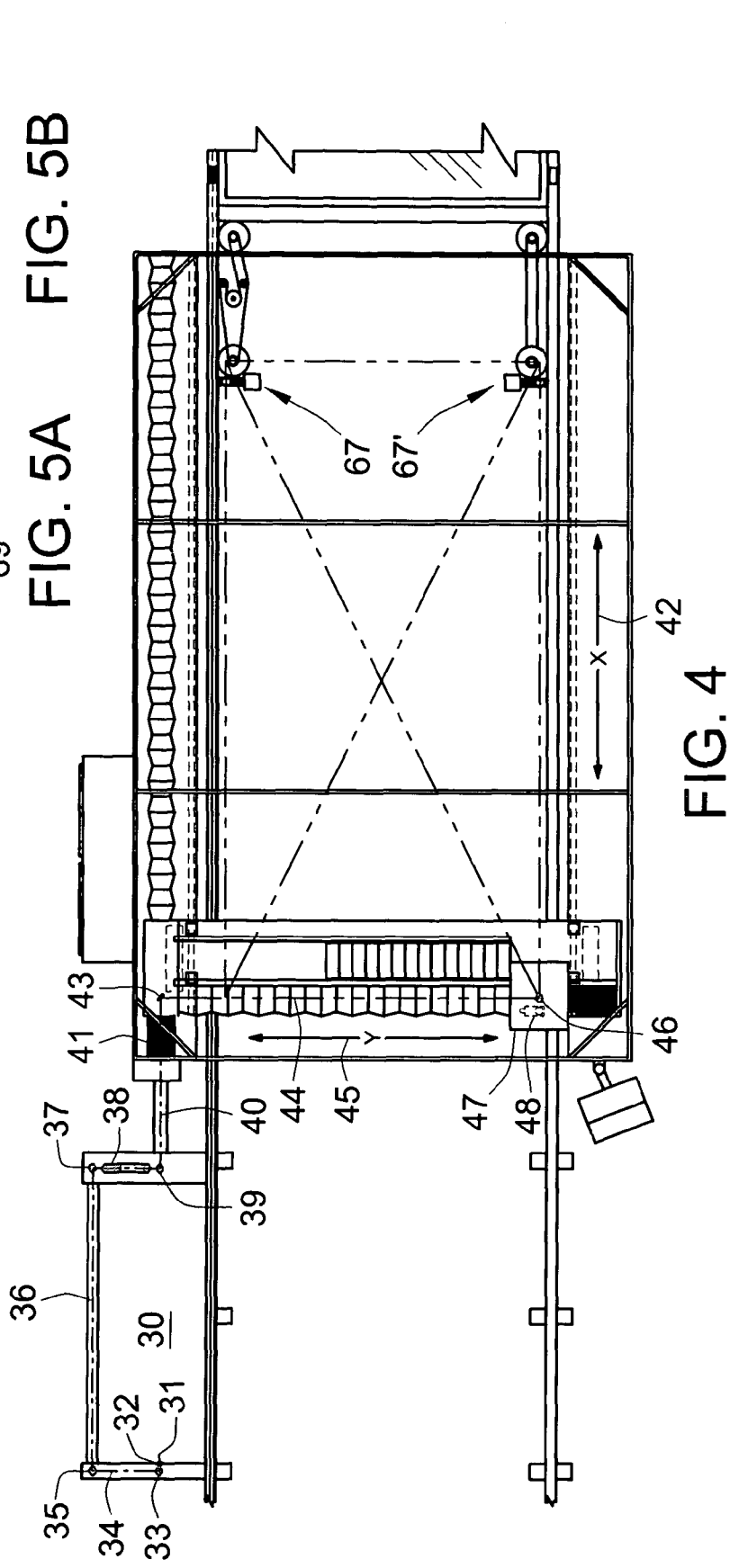

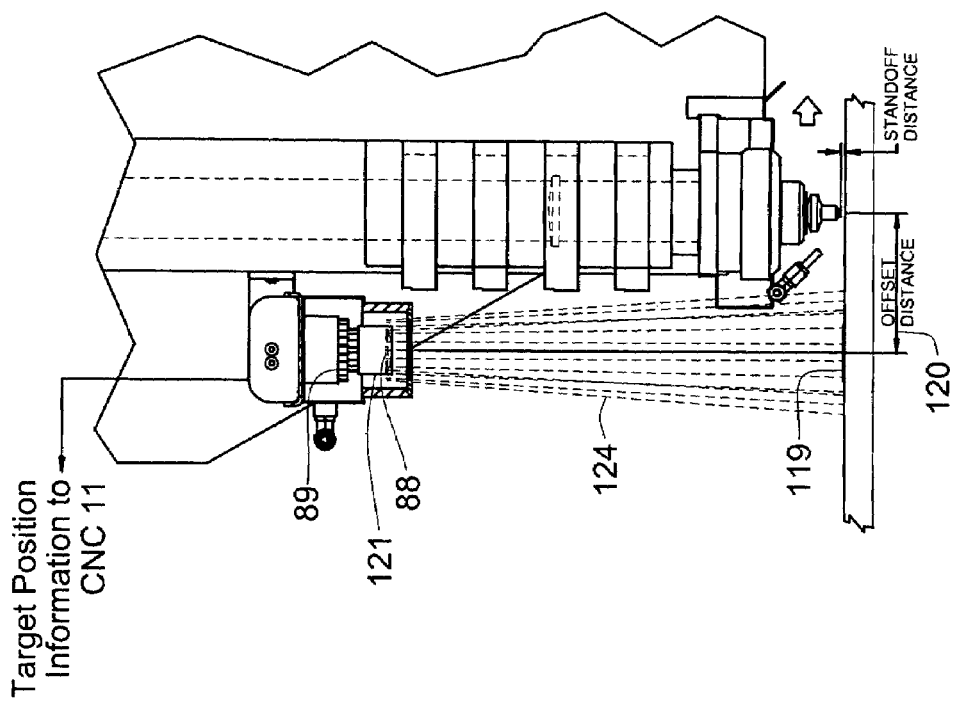
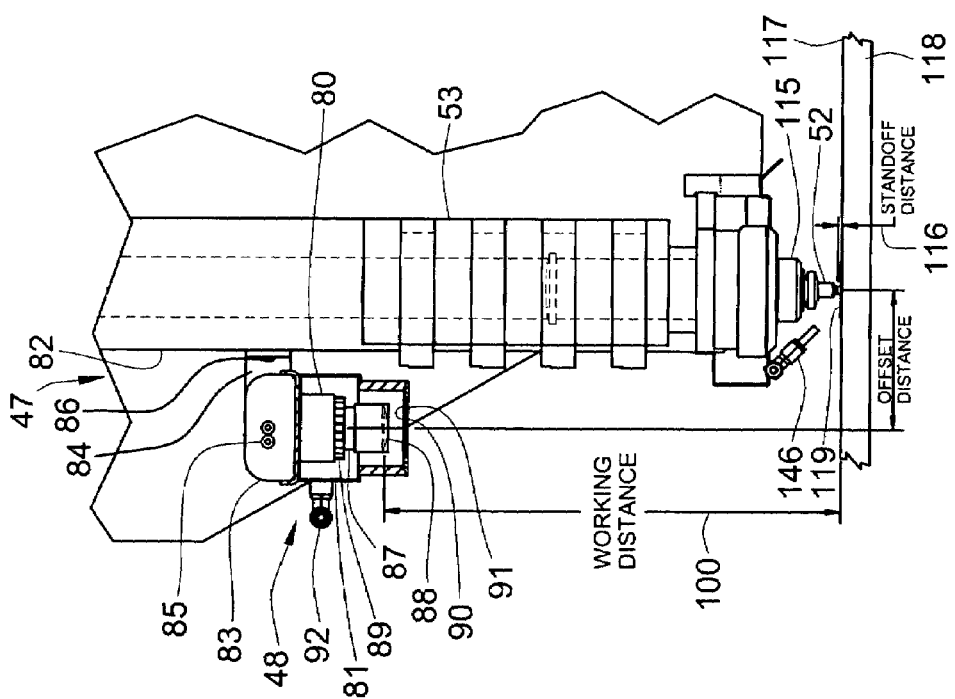

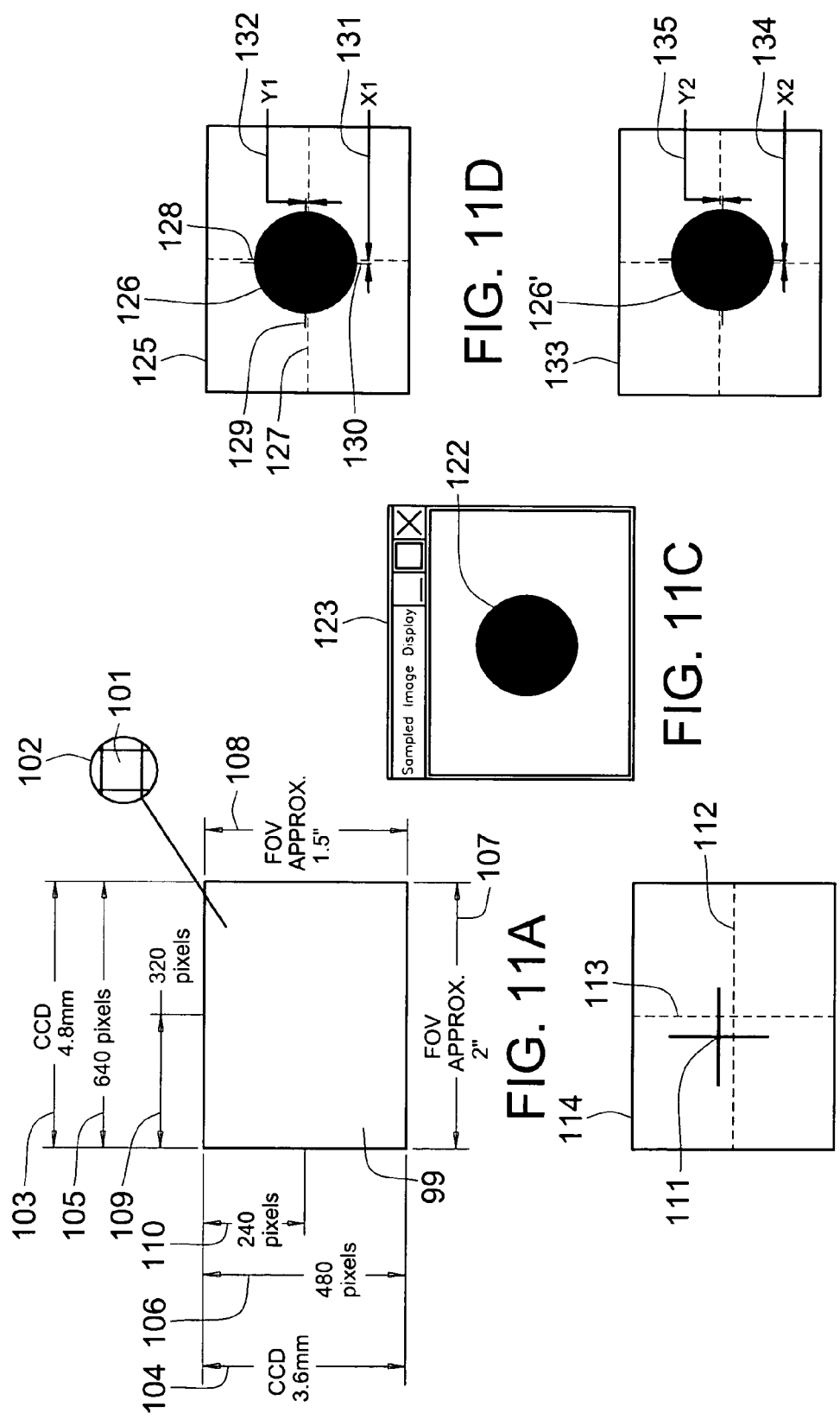

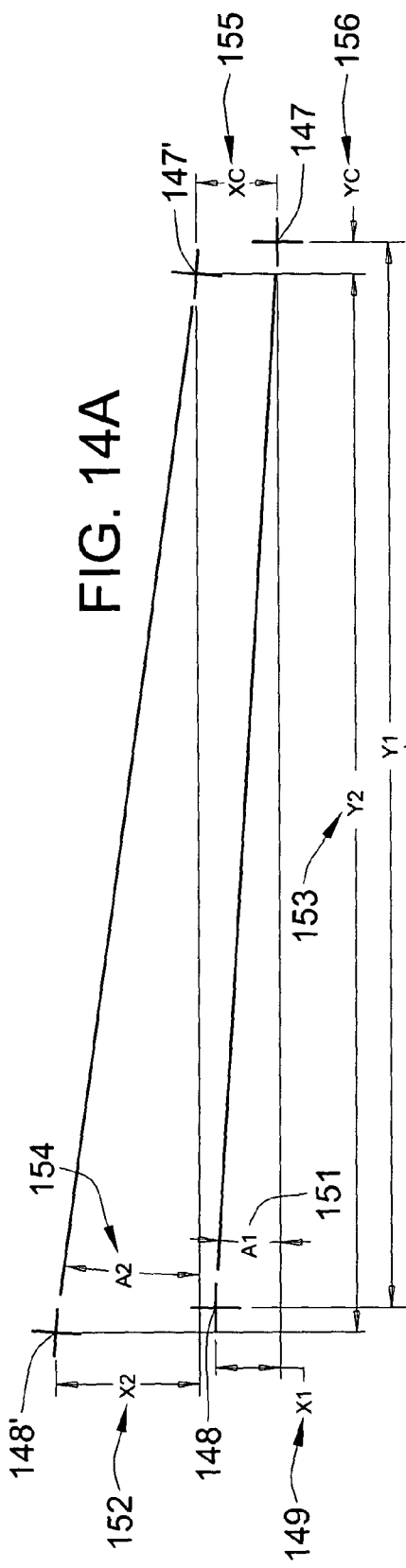
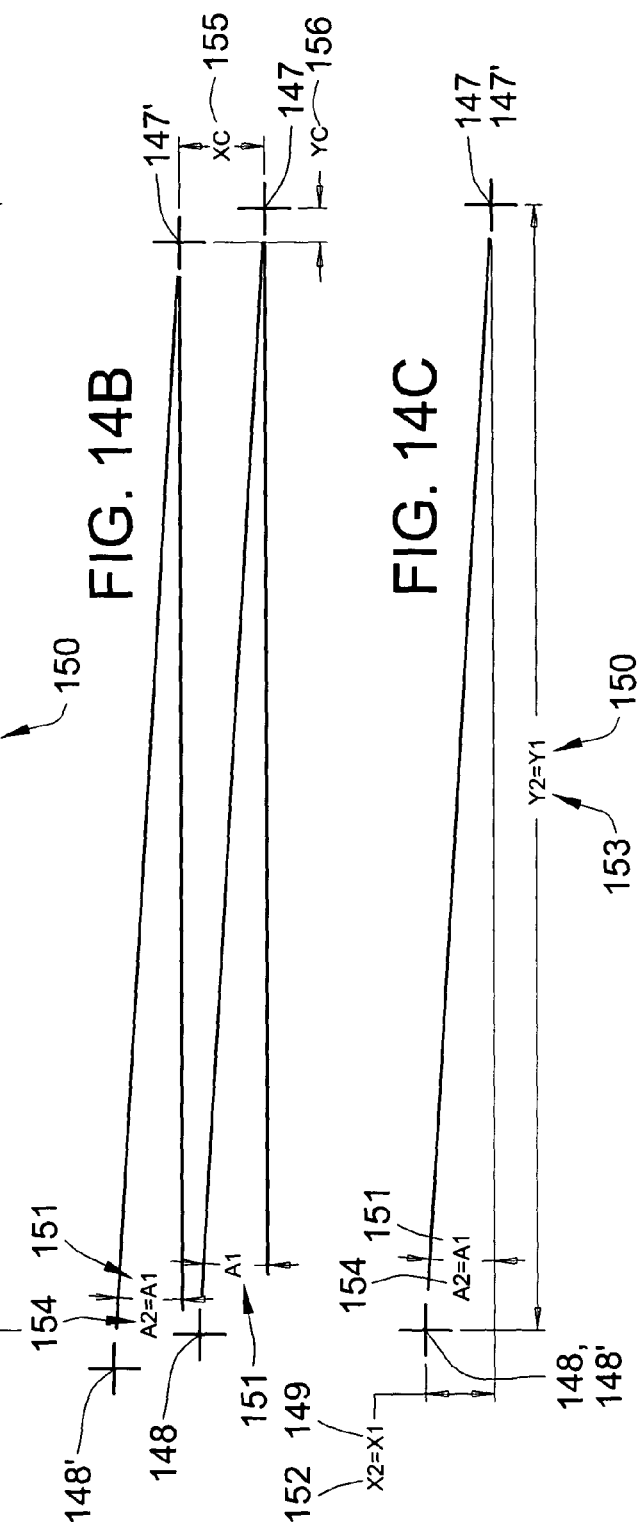
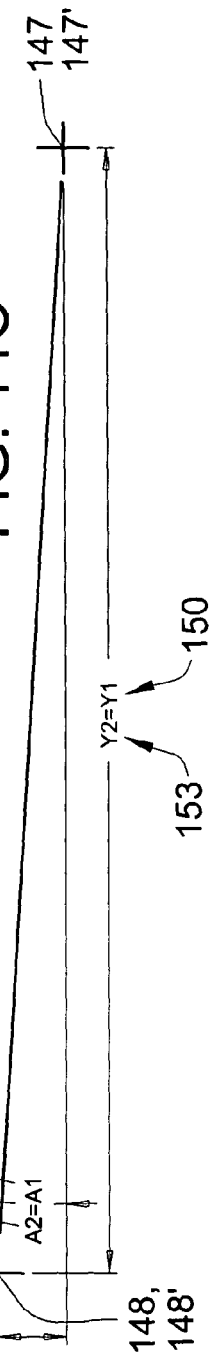
FIG. 14A
FIG. 14B
FIG. 14C

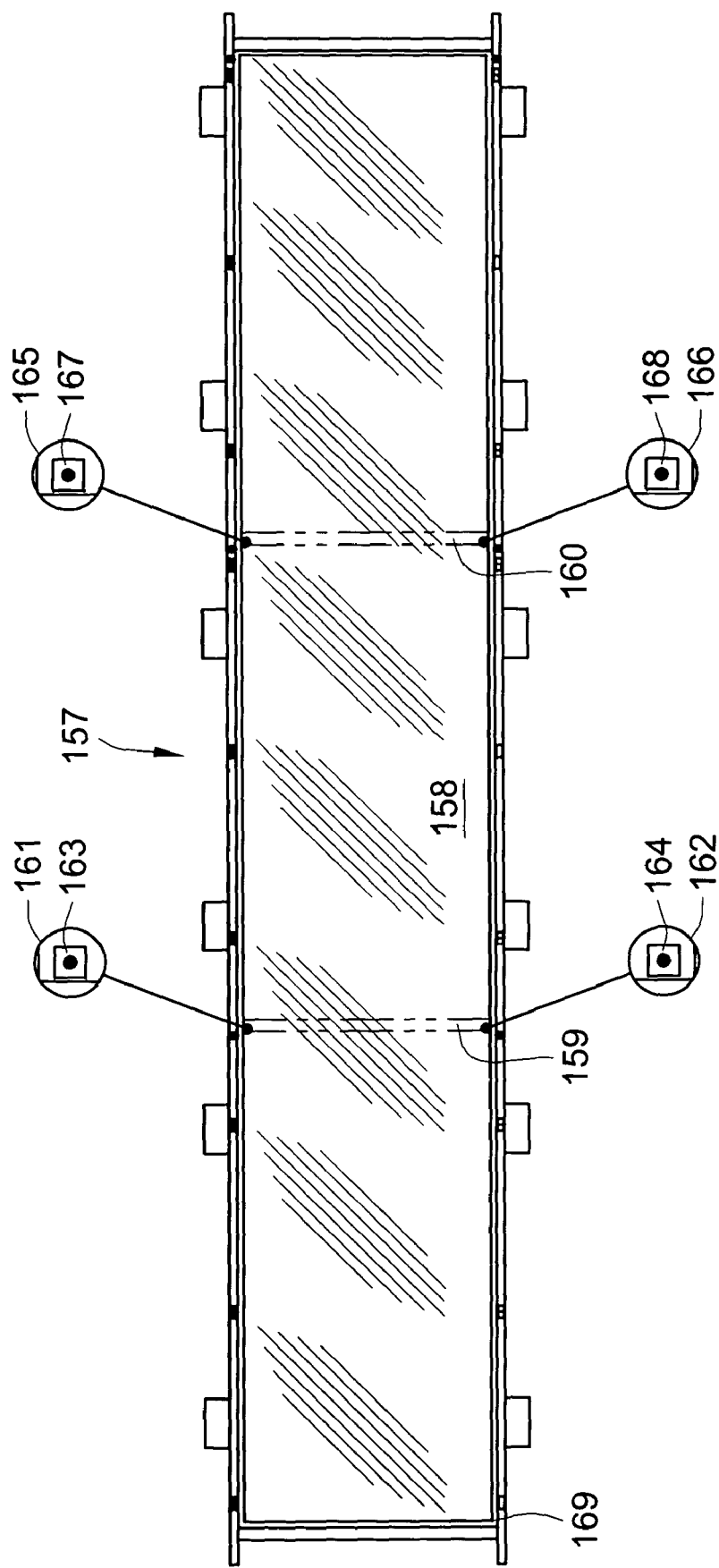

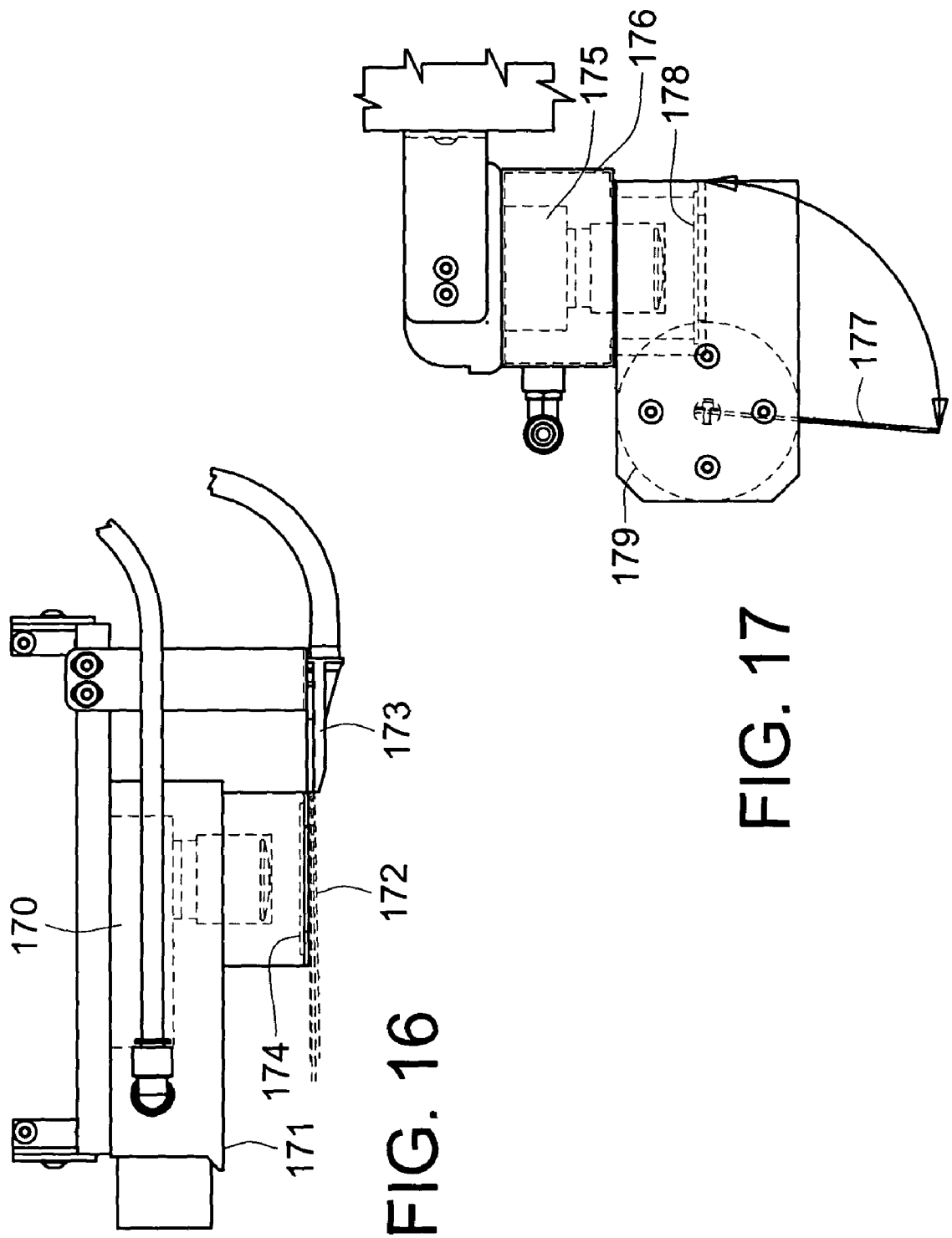

LASER MACHINE TOOL WITH IMAGE SENSOR FOR REGISTRATION OF WORKHEAD GUIDANCE SYSTEM

FIELD OF THE INVENTION

The present invention relates generally to machine tools and more particularly relates to laser equipped machine tools for cutting, welding or marking a workpiece. The present invention specifically relates to computer controlled laser machine tools for cutting, marking, or welding a workpiece wherein the machine tool work zone is smaller than the workpiece such that the workpiece is indexed through the work zone for processing.

BACKGROUND OF THE INVENTION

A computer controlled machine tool has been developed for laser cutting and marking a workpiece wherein the working zone of the machine tool is smaller than the workpiece that can be processed. The workpiece is carried on a translatable worktable or pallet that is indexed through a working zone. There is a small overlap within the work zone at the trailing edge of the first working position and at the leading and trailing edge of subsequent working positions. The leading portion of the workpiece is positioned within the working zone and is processed. The work support is then indexed to position a subsequent portion of the workpiece in the work zone for processing. This configuration creates interrupted cuts wherein a cut is stopped in one processing zone and must be reestablished in a subsequent processing zone. Registration of the workhead guidance system relative to the workpiece must be maintained along the entire length of the workpiece to accurately produce a part.

The work support carrying and guidance system is such that the position of the work support is repeatable but its motion is not perfectly straight. Locating pins locate the work support, also called a worktable or a pallet, final position but the locating pins cannot assure that registration of the workhead guidance system relative to the workpiece is maintained. The workpiece rests freely on the work support. The workpiece is not clamped in any way. The workpiece can shift slightly on the work support during processing, due to thermal effects, and the workpiece can shift on the work support when the work support is indexed.

Known methods of locating a part on a laser machine tool are not entirely satisfactory in addressing this registration problem. For example Klingel et al. U.S. Pat. No. 5,132,510 discloses a workpiece position sensing assembly 120 (col 6, lines 6–7) including a depending sensor 122 that extends below the upper surface of the workpiece 38 (col 6, lines 14–17), to measure or sense the position of the workpiece (col 6, lines 17–22), by measuring the position of at least two cutouts (col 8, lines 8–27). The apparatus is further described in Kilian et al. U.S. Pat. No. 5,304,773 at col 1, lines 42–52 as a sensor probe and as a mechanical probe. Measuring probes are available in a variety of forms from RENISHAW.

Kilian et al. U.S. Pat. No. 5,304,773 discloses an optical sensor assembly (col 2 lines 19–27), which measures the position of a workpiece by sensing passage of a light beam over the edge of a reference formation (the edge of a hole or shape cut into the workpiece) (col 2, lines 34–42). Col 8, lines 48–53 describes the first step in using the sensor assembly is to cut a square hole for calibration of the guidance system for a workpiece of a new thickness and carefully remove the internal cutout (col 8, lines 59–60).

Laser workhead nozzle capacitive sensor height controls are available, but are found lacking as a measuring probe or optical sensor.

The objection with all above described measuring methods is all require a hole in the workpiece. The hole must be of sufficient size for the measuring method utilized. For best accuracy two widely separated holes should be measured. There is no assurance the workpiece will have holes within the overlap work zone. Requiring holes be cut within the overlap work zone may increase the amount of scrap. It cannot be assured that the internal cutouts will fall from the holes. The internal cutout must fall free or must be removed before the hole can be measured. Should a workpiece shift while a cutout is being removed registration of the workpiece will be lost.

BRIEF SUMMARY OF THE INVENTION

It is an objective of the present invention to provide a computer controlled laser machine tool, wherein the machine tool work zone is smaller than the workpiece that can be processed, the machine tool having an apparatus to register the workhead guidance system to the workpiece without requiring a hole in the workpiece. In accomplishing the objective the machine tool is provided with an image sensor, a form of a digital camera, to measure the position of targets etched in or affixed to the surface of the workpiece. Registration of the workhead guidance system relative to the workpiece is checked before and after the work support is indexed.

In one mode of practicing the present invention the laser machine tool etches targets into the surface of a workpiece. The targets are measured by the image sensor to determine their position before and after the work support is indexed. If the indexed target positions are shifted, when compared to the pre-index target positions, corrective action is taken to re-register the workhead guidance system to the workpiece.

In the preferred mode of practicing the present invention the laser machine tool etches registration marks into the surface of a workpiece indicating where targets are to be affixed. Adhesive backed or magnetic targets are affixed to the workpiece at indicated positions. The affixed targets are measured by an image sensor to determine the position of target pairs before and after the work support is indexed. If the indexed target positions are shifted, as compared to the pre-index target positions, corrective action is taken to re-register the workhead guidance system to the workpiece.

In an alternate mode of practicing the present invention, adhesive backed or magnetic targets are affixed to the workpiece at predetermined positions located by manually measuring from a corner of the workpiece and/or from a previously affixed target. The affixed targets are measured by an image sensor to determine the position of the targets before and after the work support is indexed. If the indexed target positions are shifted, compared to the pre-index target positions, corrective action is taken to re-register the workhead guidance system to the workpiece.

It is a further objective of the present invention to provide a registration method and apparatus capable of checking and if necessary correcting the registration of a workhead guidance system to a workpiece through a plurality of work support indexes.

Other objectives of the present invention are to provide a method to automatically calibrate an image sensor mounted on a laser machine tool, to automatically focus an image sensor mounted on a laser machine tool, to automatically check the corrected registration of the workhead guidance system to the workpiece, and to provide an apparatus to keep the image sensor lens clean.

Though registering a workhead guidance system with an image sensor is herein described adapted to a laser cutting and marking machine tool, the present invention is adaptable to a laser machine tool adapted for any one of or any combination of cutting, marking and welding operations.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 4 is an enlarged view of the working area of the laser machine tool of FIG. 1.

FIG. 5A is an enlarged view of a powered locating pin shown in the released position.

FIG. 5B is the powered locating pin of FIG. 4A but is shown in the locked position.

FIG. 9A is a partial side view illustration of an image sensor mounted on a laser machine tool workhead with the workhead setting the image sensor working distance over an image target.

FIG. 9B is an illustration of workhead of FIG. 8A moved an offset distance so the image sensor can view the image target.

FIG. 11A is an illustration of the field of view of the image sensor.

FIG. 11B is an illustration of an etched target image as seen by the image sensor.

FIG. 11C is an illustration of a printed target image as seen by the image sensor sampled image display.

FIG. 11D is an illustration of a captured image of a image target captured as a first step for determining X and Y pixel to unit of travel conversion factors.

FIG. 11E is the an illustration of a captured image of the image target of FIG. 11D after the workhead has been repositioned one millimeter in the X and Y-axis directions as a second step for determining X and Y pixel to unit of travel conversion factors.

FIG. 14A is an exemplar plot of image targets before and after the work support is indexed.

FIG. 14B is a plot of the relative position of the image targets of FIG. 14A after having applied a coordinate rotation correction.

FIG. 14C is a plot of the relative position of the image targets of FIG. 14B after having applied an X and Y coordinate shift correction.

FIG. 15 is an illustration of a load station for a 10 foot by 60 foot workpiece with a workpiece having image targets affixed and ready for processing.

FIG. 16 is an illustration of an image sensor mounted in a protective housing and adapted with a shield gas flow to keep the housing lens clean.

FIG. 17 is an illustration of an image sensor mounted in a protective housing and adapted with a shutter to keep the housing lens clean.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
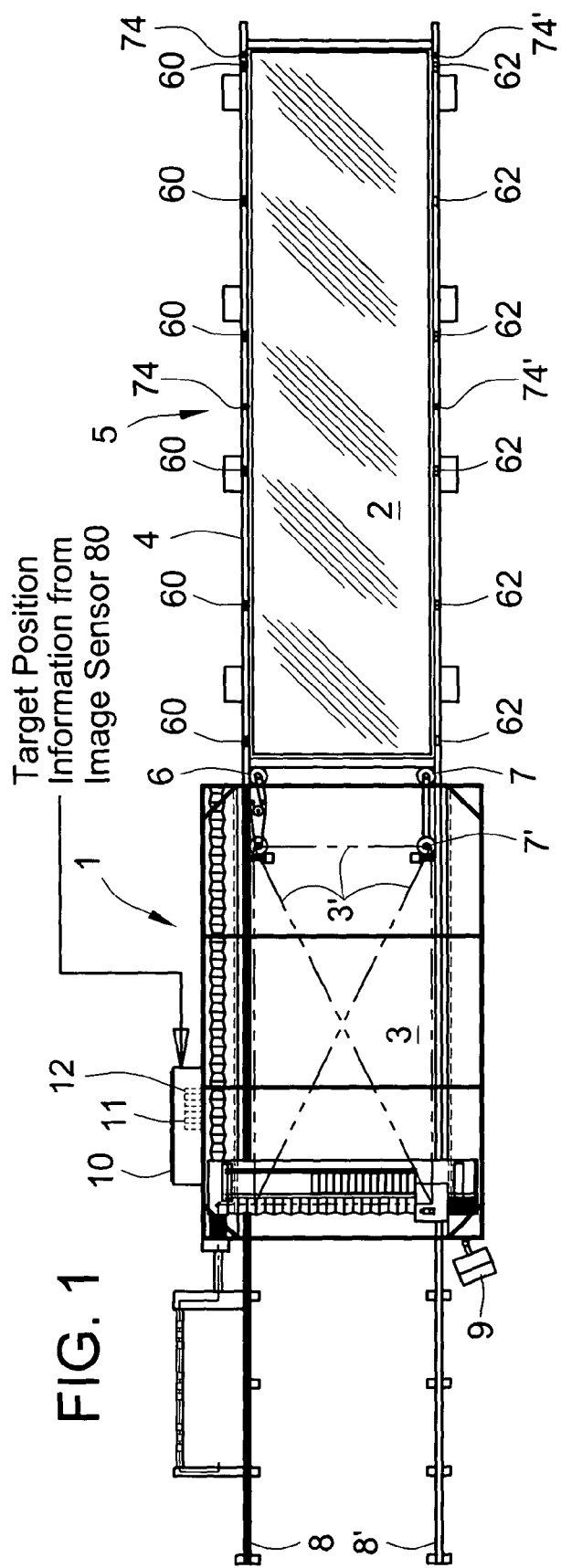
FIG. 1 is an illustration of a computer controlled laser machine tool wherein the workpiece is larger than the machine tool work zone.

FIG. 1 is an illustration of a computer controlled laser machine tool 1 wherein a workpiece 2 is larger than a work zone 3 of the machine tool. The work zone 3 of exemplar machine tool 1 is nominally ten feet wide by 20 feet six inches long and the workpiece 2 is nominally ten feet wide by forty feet long. The work zone 3 is outlined and crossed by phantom lines 3'. The workpiece 2 is laying on a translatable work support 4. The translatable work support 4 is also called a worktable or a pallet. The worktable 4 is residing on a load/unload station 5 and is driven in and out of the machine tool work zone by a friction drive apparatus 6. A pair of wheels 7 and 7' counteracts the driving forces of friction drive 6 such that the worktable 4 remains on its guide way. Support rails 8 and 8' support the leading end of worktable 4 when it extends beyond the work zone 3. Operator Station 9 is the man machine interface for the machine tool 1. Electrical cabinet 10 houses a computer numerical control (CNC) 11, servo drives 12 and other electrical and electronic control components for machine tool 1. The CNC, as is well known, controls the movement and functioning of the machine tool in performing its machining functions. As an element of accomplishing that control, the CNC 11 maintains registration information of the workhead guidance system, as will be discussed further below.

Figure 2:
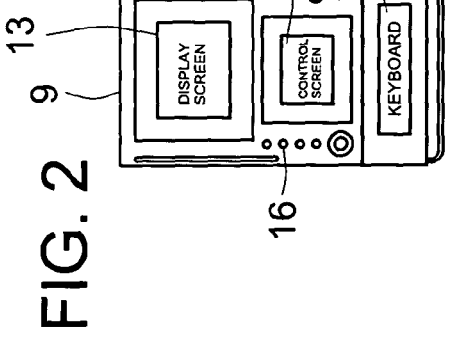
FIG. 2 is an illustration of the operator station of machine tool 1.
Figure 3:
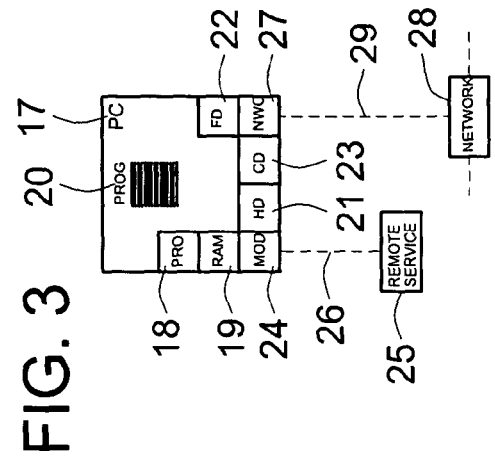
FIG. 3 is an illustration of a personal computer that communicates with the operator station and the computer control of machine tool 1.

FIG. 2 is an illustration of the operator station 9 of machine tool 1. The operator station 9 is comprised of a touch display screen 13 for displaying a program and or other information relative to the operation and control of machine tool 1. A touch control screen 14 provides a machine operator various selectable control functions for machine tool 1. A keyboard 15 provides an operator the capability to enter or edit machine control data. A plurality of switches 16 provide various laser control functions. Operator station 9 communicates with a personal computer 17 FIG. 3.

The personal computer (PC) 17 has a processor 18 and memory 19 for manipulating a control program 20 and digital data. In the exemplar machine tool 1, PC 17 is mounted inside the operator's station 9. The PC 17 has a hard drive 21 for storage of machine control programs and data. Optional floppy drive 22 and compact disk drive 23 provide capability to load or unload control programs and data for machine tool 1. An optional modem 24 provides capability for remote factory service 25 of machine tool 1 via phone line 26. An optional network card 27 provides capability for the machine tool 1 to be connected to a factory computer network 28 via cable 29. The PC 17 communicates with the operator station 9 and the computer control 11 controlling machine tool 1 and participates in the control and operation of machine tool 1.

FIG. 4 is an enlarged view of the working area of the laser machine tool 1 of FIG. 1. Machine tool 1 has a laser resonator 30 capable of emitting a laser beam 31 via an output coupler 32 to a mirror 33 where it is reflected along path 34 to mirror 35. The laser beam is reflected from mirror 35 along path 36 to mirror 37 where it is directed through a collimator 38. Exiting collimator 38 the beam is directed to mirror 39 and reflected along path 40 into beam path 41 parallel to the X-axis coordinate 42 of machine tool 1. The beam impinges on mirror 43 then is reflected along path 44 parallel to the Y-axis coordinate 45 of machine tool 1 to mirror 46. Mirror 46 is mounted on workhead 47. Forward of mirror 46 is an image sensor apparatus 48.

Figure 6:
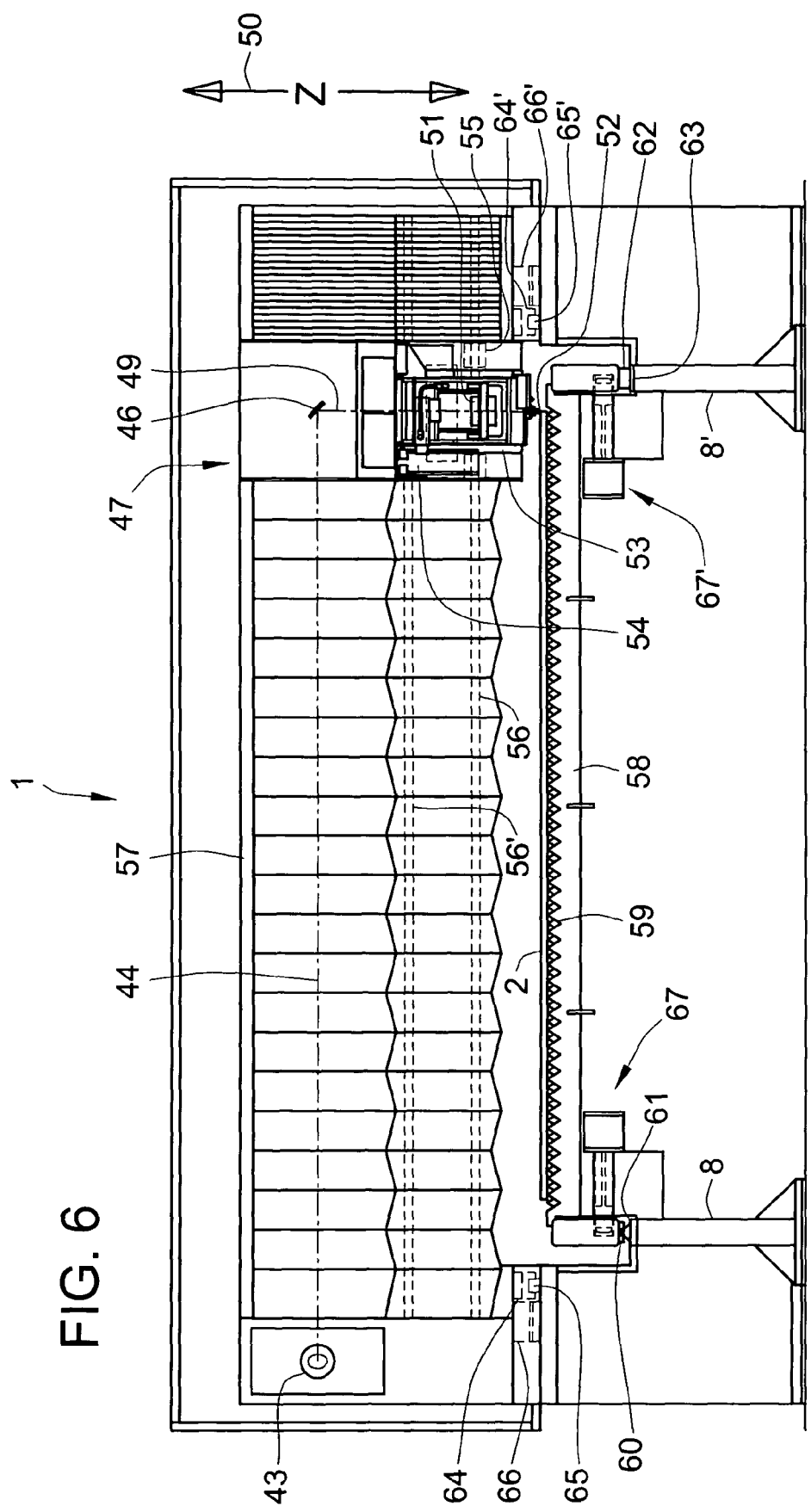
FIG. 6 is an end view illustration of the laser machine tool taken along 6—6 of FIG. 8.

Referring to FIG. 6 the beam is reflected from mirror 46 along path 49 parallel to the Z-axis coordinate 50 through a focusing lens (not shown) mounted in a cartridge 51 and exits from nozzle 52. The workhead 46 is adapted with a cutting head 53. The cutting head 53 is driven parallel to the Z-axis 50 by a servomotor 54 that raises and lowers the cutting head 53 and nozzle 52 relative to the workpiece 2. The X-axis 42, Y-axis 45 and Z-axis 50 are mutually perpendicular. The workhead 47 is carried by linear bearings 55 on linear ways 56 and 56' that are mounted to bridge assembly 57. Best seen in FIG. 6, the worktable 4 has a plurality of slats or blades 58 that support the workpiece 2. The upper edge 59 of the slats 58 are cut in a saw-tooth fashion to minimize contact with the workpiece 2. Worktable 4 is carried and guided on one side by a plurality of vee rollers 60 that ride on a inverted vee way 61 supported in part by support 8. Worktable 4 is carried on the opposite side by a plurality of flat rollers 62 that ride on a flat way 63 supported in part by support 8'. The bridge 57 is carried by linear bearings 64 and 64' riding on linear ways 65 and 65' and is driven along the X-axis by linear servomotors 66 and 66'. When the worktable 4 is positioned in the work zone 3 its final position is located and locked in place by powered locators 67 and 67'.

FIG. 5A is an enlarged illustration of the powered locator 67 and is shown in the released position. Referring to FIG. 5A, powered locator 67 is comprised of a driving cylinder 68 having a piston 69 and a piston rod 70. Cylinder 68 is attached to a pin guide tube 71. Piston rod 70 is attached to a locating pin 72 and is locked thereto by a nut 73. Worktable 4, a fragment thereof is shown, is adapted with a socket 74 to receive the locating pin 72. The piston 69 is shown in the retracted position such that the location pin 72 is retracted from the socket 74 and resides within the pin guide tube 71. As best seen in FIG. 1, and 15 worktables are adapted with a plurality of sockets 74 and 74' such that a pair of sockets is associated with each positioning of the worktable within the work zone 3.

FIG. 5B is an illustration of the powered locator 67 of FIG. 5A but is shown in the locked or locating position. Referring to FIG. 5B, the piston 69 is shown in the extended or locked position such that while a portion of the locating pin 72 remains within the guide tube 71 the locating pin 72 has entered the socket 74 such as to locate the final position of the worktable 4 and lock it in place.

Figure 7:
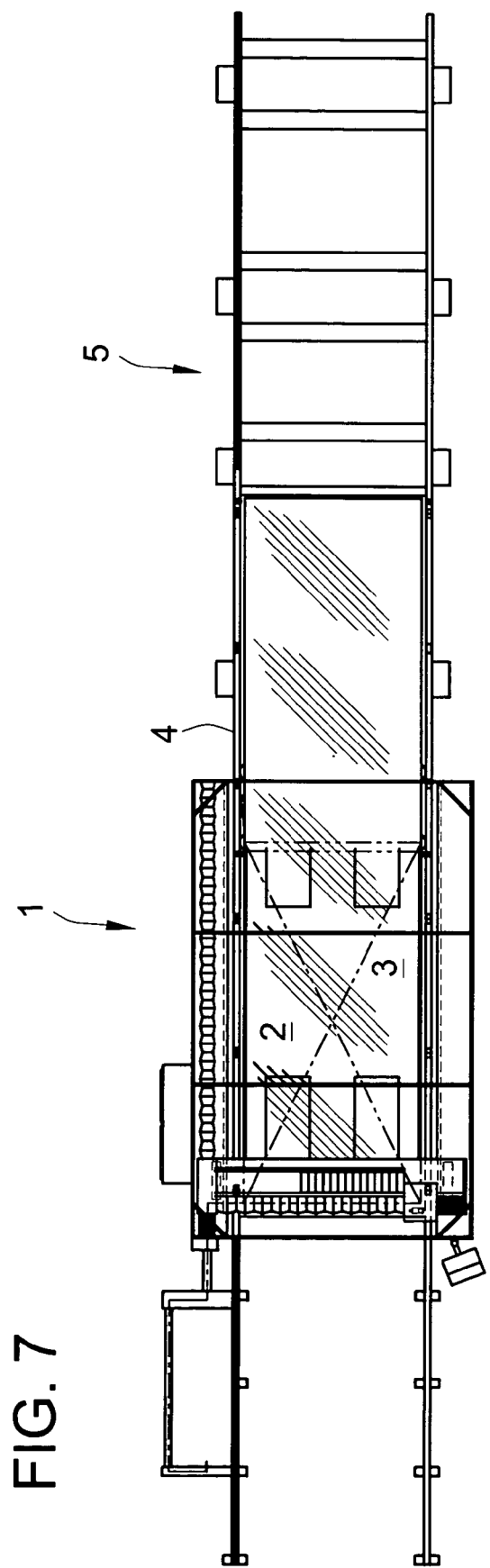
FIG. 7 is an illustration of the laser machine tool of FIG. 1 with the work support moved to a first working position.

FIG. 7 is an illustration of the laser machine tool of FIG. 1 with the worktable 4 moved to a first working position such that the leading portion of the workpiece 2 resides within the work zone 3.

Figure 8:
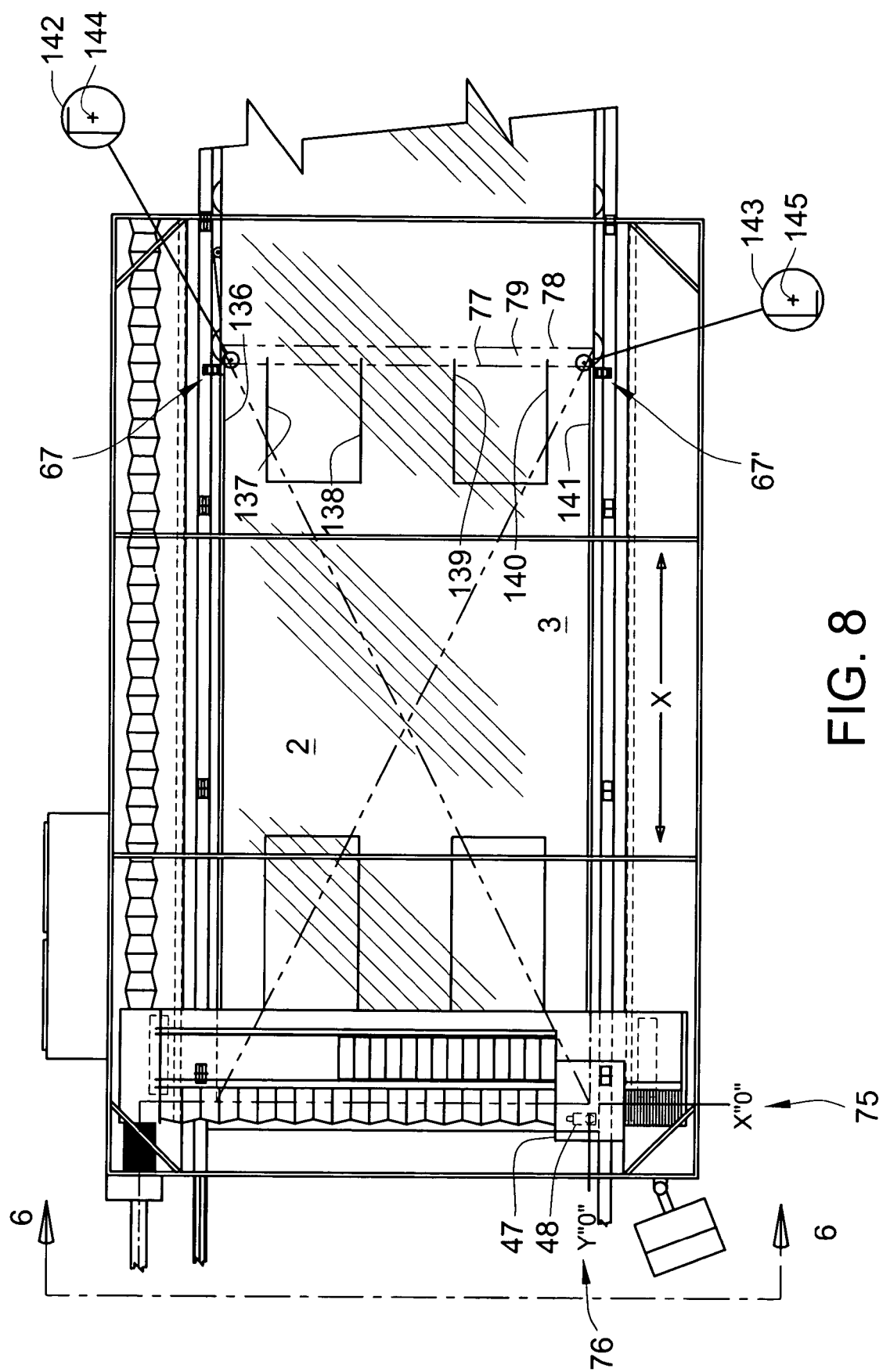
FIG. 8 is an enlarged view of the machine tool work zone of FIG. 7.

FIG. 8 is an enlarged illustration of the machine tool work zone of FIG. 7. When the worktable 4 is locked in the first working position by powered locators 67 and 67' the leading edge and one corner of the workpiece 4 is located proximate to coordinate X "0" 75 and coordinate Y "0" 76 of the working zone 3. The X "0" 75 and Y "0" 76 coordinates are reference positions for the computer control system for positioning the workhead 47 relative to the workpiece 2. Proximate the trailing edge of work zone 3 outlined by leading boundary line 77 and trailing boundary line 78 is an overlap zone 79. The overlap zone 79 is such that its area is within the operating range of workhead nozzle 52 and of image sensor apparatus 48. The overlap zone 79 is also such that when the worktable 4 is indexed to a second working position the leading boundary line 77 of overlap zone 79 will reside proximate the coordinate X "0" 75 of FIG. 8.

FIG. 9A is a partial side view illustration of the image sensor apparatus 48 mounted on the workhead 47. The image sensor apparatus 48 in the illustrated embodiment is comprised of an image sensor 80, enclosed in a housing 81 that is attached to a vertical member 82 of the cutting head 53 via brackets 83 and 84 and fasteners 85 and 86. Other forms of mounting can also be used. The image sensor 80 is adapted with a lens spacer 87, a focusing lens 88 and a Light Emitting Diode (LED) strobe light comprised of a plurality of LEDs 89 mounted about the focusing lens 88. The image sensor 80 is also called a vision system, an inspection camera or a SmartImage sensor such as a Model 530MR DVT inspection camera manufactured by DVT Corporation, Norcross, Ga. The housing 81 has a lens 90, a lens retainer 91 and is adapted to accept a fitting 92 for being purged with a clean dry gas such as air or nitrogen. The lens 90 is preferably made of glass such that it can be periodically cleaned without scratching it. APG Vision, Allison Park, Pa., manufactures housings 81 for the SmartImage sensor 80.

Figure 10C:
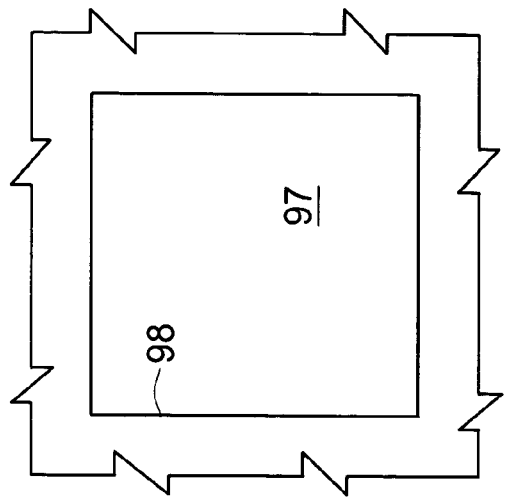
FIG. 10C is an illustration of a section of a workpiece having a registration mark etched into its surface indicating where a target image is to be attached.
Figure 10B:
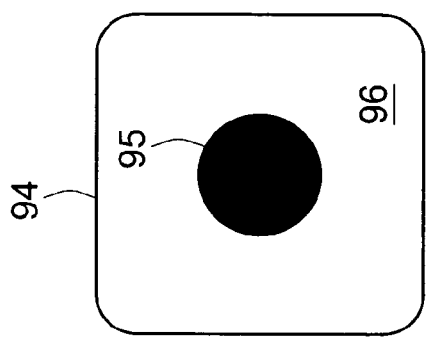
FIG. 10B is an illustration of a printed target image.
Figure 10D:
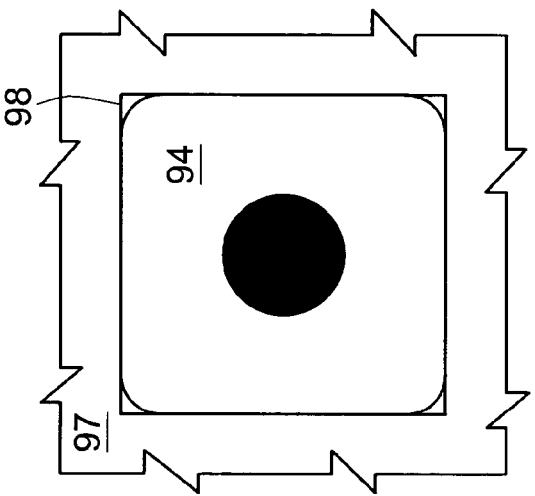
FIG. 10D is an illustration of the section of workpiece of FIG. 10C with the target image of FIG. 10B attached to the workpiece.
Figure 10A:
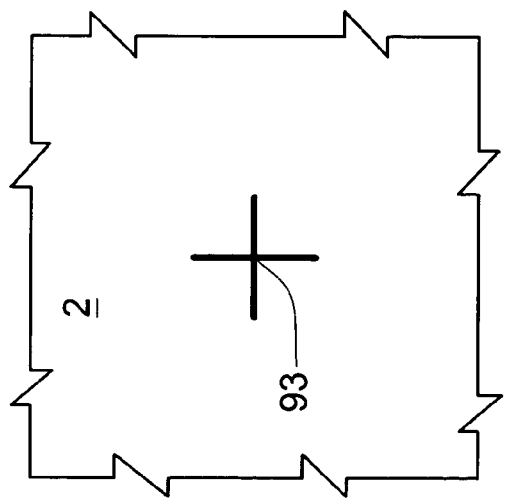
FIG. 10A is an illustration of a section of a workpiece having an target image etched its surface.

FIG. 10A is an illustration of a section of a workpiece 2 that has a target image 93 etched into its surface for use with image sensor apparatus 48. It is well known that laser machine tools such as laser machine tool 1 can etch lines, numbers, letters or shapes into the surface of a workpiece. In one mode of practicing the present invention the laser machine tool 1 etches target images into the surface of the workpiece that are measured by the image sensor 80 before and after the worktable is indexed. Laser machine tool 1 can process several types of metal including carbon and construction grade steel, aluminum, brass, and stainless steel. In developing the invention it was found that the image sensor could not reliably measure the etched target image in certain types of metal, for example, carbon and construction grade steel. There was inadequate contrast between the etched target image and the surface of the metal for the inspection camera to make reliably accurate measurements.

FIG. 10B is an illustration of a printed target 94 having a black, non-reflective target image 95 on a white background 96. The printed target 94 is adhesive coated on its backside. Alternatively to having an adhesive coated backside it is thought that the printed target 94 can be printed on magnetic material and as such can be used many times. The white background 96 can be a gloss, semi-gloss or a non-reflective surface. The size, shape and color of the target image 95 is not very important as long as it fits entirely within approximately eighty percent or less of the camera field of view, has a non-reflective surface finish and contrasts well with the background 96. The image sensor 80 has integrated measurement tools or functions that can determine the center of shapes, called blobs. A target image is preferably a symmetrical shape. Background 96 size, shape and color is also not important as long as it contrasts well with the target image 95. A workhead nozzle capacitive height control system can accurately sense a workpiece through the printed target 94.

FIG. 10C is an illustration of a section of a workpiece 97 having a registration mark or shape 98 etched into its surface indicating where a printed target 94 is to be attached.

FIG. 10D is an illustration of the section of workpiece 97 of FIG. 10C with the printed target 94 of FIG. 7B attached relative to the registration mark 98.

FIG. 11A is an illustration of a Charged Coupled Device (CCD) 99 of the image sensor 80 and its corresponding Field Of View (FOV) size as adapted for the present invention. The FOV is the area that can be seen by the image sensor. The FOV size is dependent on the CCD size and the working distance 100, FIG. 9A, the distance from the camera lens to the part to be viewed.

FIG. 11A represents the heart of the image sensor 80. The CCD 99 is divided into smaller elements called pixels. Each pixel 101, shown in enlarged view 102, measures light intensity and translates it into an electrical voltage. The number of pixels that exist horizontally and vertically on a CCD and the FOV size defines the resolution of an image. The inspection camera chosen for an initial embodiment has a CCD size of 4.8 mm 103×3.6 mm 104 containing 307,200 pixels, 640 pixels per row 105 and 480 rows 106. In the exemplary CCD each pixel 101 is 7.4 micrometers square. The CCD size and the 16 inch working distance chosen for this embodiment produces a FOV measuring approximately 2 inches 107×1.5 inches 108. The image sensor 80 is mounted on exemplar machine tool 1 such that the 2 inch FOV dimension 107 is parallel to the X-axis of laser machine tool 1 and the 1.5 inch FOV dimension 108 is parallel to the Y-axis. The center of the CCD is 320 pixels 109 and 240 pixels 110 from the upper left corner of the FOV.

FIG. 11B is an illustration of an etched target image 111 as seen by the image sensor 80. Imaginary horizontal 112 and vertical 113 dotted lines are shown through the centerline of the FOV 114 for reference.

Referring to FIG. 9A, the cutting head 53 is adapted with a control apparatus 115 to automatically control the nozzle to workpiece stand off distance 116. The control apparatus 115 provides feedback for the Z-axis servomotor 54, FIG. 6, to control the standoff distance 116, the distance between the bottom of the nozzle 52 and the upper surface 117 of a workpiece 118. In the exemplar laser machine tool the control apparatus 115 is a capacitive sensor apparatus but other types of stand off control apparatuses are suitable. The image sensor 80 requires some initial setup before it can be used. Such setup only has to be done one time but can be checked periodically or optionally redone. A standoff distance 116, 2 millimeters for example, is selected as a standard value for use with the image sensor. The nozzle 52 is positioned over a target 119 and the Z-axis is lowered under automatic control until the nozzle 52 reaches the commanded standoff distance 116. The Z-axis position is then frozen such that the capacitive sensor ignores any change in standoff height until unfrozen. The workhead 47 is then moved an offset distance 120 such that the image sensor lens 88 is centered over the target 119, FIG. 9B. The lens 88 focusing mechanism 121 is then turned until the target image 122 FIG. 11C is sharp in a sampled image display 123 and the inspection camera exposure time is set to capture a good image. When an image is captured the LED strobe lights 89 FIG. 9B are turned on to illuminate the target 119 as depicted by dashed lines 124.

A setup calibration program is run to determine X and Y pixels to unit of travel conversion factors, i.e. pixels per millimeter travel. An image 125 is captured of a target 126 FIG. 11D. Imaginary horizontal 127 and vertical 128 dotted lines have been added to image 125 to reference the center of the FOV. Imaginary short solid horizontal 129 and vertical 130 lines have been added to the target image 126 to reference the center of the target. The captured target image 126 is slightly left and above the FOV center. The image 126 is measured by the inspection camera 80 to determine the location of the target's horizontal dimension X1 131 and vertical dimension Y1 132, in pixels, relative to the FOV center. The image sensor's integrated measurement tools can determine the target's position within 0.1 pixel. The workhead 47 is repositioned one millimeter in the X-axis 42 and Y-axis 45 coordinates, reference FIG. 4, and another image 133 FIG. 11E is captured. The image 133 is measured by the inspection camera 80 to determine the location of the target 126' horizontal dimension X2 134 and vertical dimension Y2 135, in pixels, relative to the FOV center. The absolute value of X1-X2 equals an X-axis pixels per millimeter travel constant. The absolute value of Y1-Y2 equals a Y-axis pixels per millimeter travel constant. Pixels per millimeter travel constants are stored in computer memory. Pixels per millimeter of travel constants are divided by 25.4 to determine pixels per inch travel constants.

Referring again to FIG. 8, workpiece 2 in the first working position is shown having interrupted cuts 136, 137, 138, 139, 140, and 141 all terminating within the overlap zone 79. Magnified views 142 and 143 show target images 144 and 145 etched into the surface of workpiece 2 within the overlap zone 79. Upon completion of processing the workpiece 2 in the first working position and in preparation to index the work support 4 to a second working position, the target images 144 and 145 are etched into the surface of the workpiece 2 by the laser 30 and the workhead 47 spaced as far apart as practical in the Y coordinate 45 FIG. 4. Referencing FIG. 9A, the nozzle 52 of the workhead 47 is positioned over the image target 144 and the Z-axis is lowered until the nozzle 52 reaches the commanded standoff distance 116. Auxiliary side jet apparatus 146 FIG. 9A is a gaseous blast source typically used for piercing carbon steel. The auxiliary side jet apparatus 146 is cycled to blow any residue from the cutting process off of image target 144. The Z-axis position is frozen such that the capacitive sensor 115 ignores any change in standoff height. The workhead 47 is moved the offset distance 120 such that the image sensor lens 88 is approximately centered over the target 144, reference FIG. 9B. The inspection camera 80 captures an image of the target 144. The commercially available inspection camera has integrated measurement tools which are used to determine the position of target 144 relative to the center of the field of view. The position of target 144 is stored in computer memory. The Z-axis position is unfrozen and the nozzle 52 of the workhead 47 is positioned over image target 145. In like manner the position of image target 145 is measured and stored in computer memory. The X and Y distance of image target 145 and rotation angle relative to target 144 are calculated and stored in computer memory. The workhead 47 is then moved to a target location for a post index inspection proximate X "0" and the work support 4 is indexed to a second work position.

Figure 12:
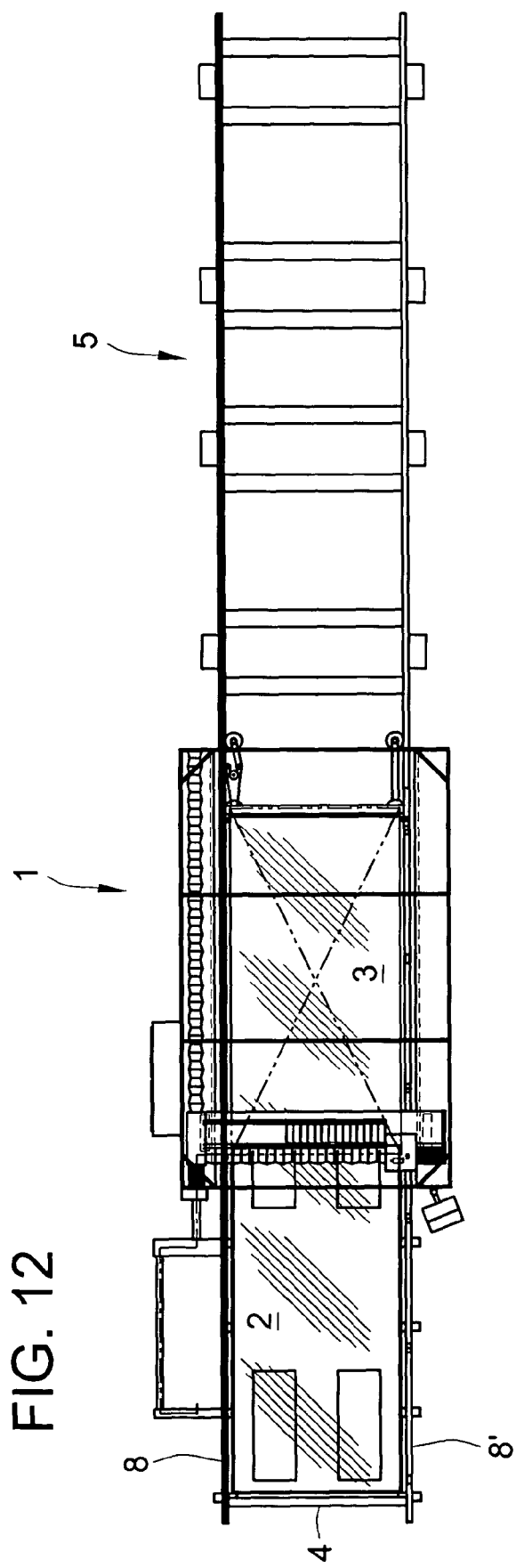
FIG. 12 is an illustration of the laser machine tool of FIG. 1 with the work support moved to a second working position.

FIG. 12 is an illustration of the laser machine tool of FIG. 1 with the worktable 4 moved to a second working position such that the leading portion of the worktable 4 and workpiece 2 is supported by support rails 8 and 8' and the trailing portion of the workpiece 2 and worktable 4 resides within the work zone 3.

Figure 13:
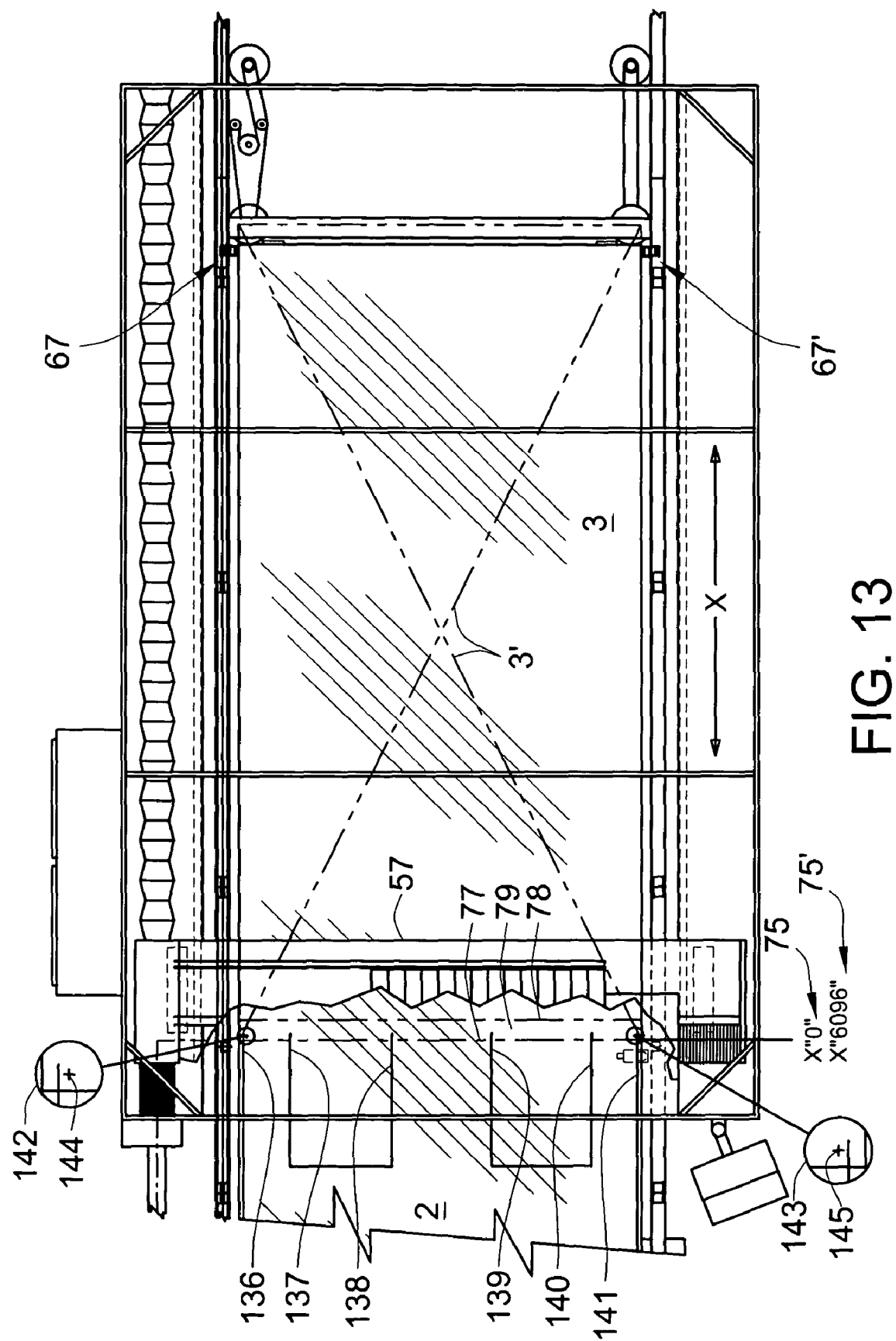
FIG. 13 is an enlarged view of the laser machine tool working zone of FIG. 12.

FIG. 13 is an enlarged illustration of the working zone of the machine tool of FIG. 12. The bridge assembly 57 is shown broken away so that the overlap work zone 79 can be clearly seen. At the second working position the leading overlap work zone boundary line 77, FIG. 13, is positioned proximate to the X "0" position 75, FIGS. 8 and 13. When worktable 4 is locked in position in the second working position by locating pins 67 and 67' the former X "0" position 75 is reset, equal the length of the index, to X 6096 millimeters 75' in the exemplar machine tool shown. Then, in the manner previously described, the image sensor determines the position of image targets 144 and 145. The target position information is stored in computer memory as separate, post work support index positions.

FIGS. 14A through 14C illustrate the method of checking and maintaining the registration of a workpiece when the work support is indexed to another working position.

FIG. 14A is an exemplar plot of target images before and after the work support 4 is indexed. Though the present invention functions by software program and mathematical analysis, graphical plots better illustrate the process, and will enable one skilled in the art to program appropriate steps and calculations into a computer of the computer controlled machine tool to accomplish what will now be demonstrated graphically. The position of target image 148 is plotted with respect to the position of target image 147. X1 149 is the X-axis distance between target images. Y1 150 is the Y-axis distance between target images. A1 151 is the rotational angle between target images. The targets, being physically positioned on the workpiece, have a given separation and orientation, and imaging of those targets by the steps just described stores the relative position and orientation in computer memory. After the workpiece is indexed, the same targets are again imaged and similar information obtained from the targets in their new position. 147' is the position of target image 147 after the work support was indexed. 148' is the position of target image 148 after the work support was indexed. X2 152 is the measured X-axis distance between target images 147' and 148' after the work support was indexed. Y2 153 is the measured Y-axis distance between target images 147' and 148' after the work support was indexed. A2 154 is the rotational angle between target images 147' and 148' after the work support was indexed. With two sets of information taken at two different positions, a processor, preferably the processor in the imaging system, but also potentially the CNC processor can determine errors introduced by indexing. XC 155 is the X distance correction that must be applied to make the position of the post index target image 147' equal to the pre index position 147. YC 156 is the Y distance correction that must be applied to make the position of the post index target image 147' equal to the pre index position 147.

Computer controls such as CNC 11 used to control laser machine tools have capability to adjust the reference coordinate system by rotating and/or shifting the coordinate system to simplify programming complex shapes and patterns. The present invention utilizes such capabilities to maintain registration of the controlling coordinate system relative to the workpiece though the workpiece position may shift when the work support is indexed. It will be seen that the CNC 11 in FIG. 1 is shown with an input derived from the image sensor 48, and the image sensor 48 shown in FIG. 9B is shown with an output to direct position information to the CNC. Thus, the commercially available image sensor produces error information as described herein, and the error information is utilized in the known coordinate adjustment systems in the CNC for adjusting the coordinate system to accommodate for positional errors introduced in indexing. Returning to the plots for a better understanding of the operation, in FIG. 14A if no position error was present after the work support index the position of target image 147' would plot the same as target image 147 and the position of target image 148' would plot the same as target image 148. The difference in positions is the error introduced during indexing the work support. Angle A2 minus angle A1 equals the rotational error introduced.

FIG. 14B is a plot of the relative position of the target images of FIG. 14A after having applied a coordinate rotation correction equal to angle A2 minus angle A1. Angle A2 154 is equal to angle A1 151 and the position of target image plots 147' and 148' are parallel to the position of target image plots 147 and 148. There remains an X error XC 155 and a Y error YC 156 between pre index target image positions 147 and 148 and post index target image positions 147' and 148'.

FIG. 14C is a plot of the relative positions of the target images of FIG. 14B after having applied X and Y coordinate shift corrections equal to XC 155 and YC 156. After correction the position of target image 147' plots the same as target image 147 and the position of target image 148' plots the same as target image 148 indicating registration of the co-ordinate system relative to the work head has been restored.

After registration of the coordinate has been restored by rotating and shifting the coordinate system, the position of target images is again determined and checked in the manner previously described and compared with pre-index target image positions and set error limits. If the target image positions are within set error limits the laser machine continues processing the workpiece restarting and finishing the interrupted cuts and performing other operations per part program. If the target image positions are not within set error limits another attempt to correct registration is made following the previously described process. The number of attempts to achieve registration is settable. If registration is not achieved within the set number of attempts an error message is displayed on the operator station and the machine tool stops operation waiting for operator attention.

FIG. 15 is an illustration of an optional load station 157 for laser machine tool 1 having a capacity for a 10 foot by 60 foot workpiece 158. The 10 foot by 60 foot workpiece 158 must indexed a plurality of times to be processed by laser machine tool 1. A plurality of overlapping work zones 159 and 160 are shown. Magnified views 161 and 162 show image targets 163 and 164 are affixed to the surface of workpiece 158 within overlap work zone 159. Magnified views 165 and 166 show image targets 167 and 168 are affixed to the surface of workpiece 158 within overlap work zone 160. The workpiece 158 is ready for processing by computer controlled laser machine tool 1.

Preferably the targets 163, 164, 167, and 168 are affixed to the workpiece 158 relative to registration marks etched into the surface of the workpiece by laser machine tool 1. In etching such registration marks before processing the workpiece, it is not necessary to maintain the registration of the co-ordinate system between work support indexes. Target image and Field Of View size is selected such that any error introduced in indexing the work support for etching registration marks falls well within the field of view of the image sensor 48 thus can be compensated for later. Alternately, the targets 163, 164, 167, and 168 are affixed to the workpiece 158 by measuring their position from a leading corner of the workpiece such as 169.

During development of the invention it was found that debris collecting on the image sensor housing lens 90, FIG. 9A, can impair performance of the image sensor 80. The debris is primarily residue, smoke and fumes from laser beam interaction with the workpiece. FIG. 16 is an illustration of an image sensor 170 mounted in a protective housing 171 and adapted to provide a shield gas flow 172 via nozzle 173 mounted proximate to the lens to keep the housing lens 174 clean.

FIG. 17 is an illustration of an image sensor 175 mounted in a protective housing 176 and provided with a shutter 177 to keep the housing lens 178 clean. The shutter 177 is driven by a rotary solenoid 179. Alternately, the shutter can be driven by a pneumatic actuator. The shutter is opened just prior to and during operation of the image sensor 175, otherwise it remains closed over lens 178 protecting it from dust.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer controlled laser machine tool comprising in combination:
    said laser machine tool having a work zone smaller than a workpiece processed such that said workpiece is indexed through the work zone for processing;
    said laser machine tool having an image sensor mounted to focus on a target on the workpiece; and
    said image sensor checking registration of said workpiece without requiring holes to be cut into the workpiece.

2. The laser machine tool of claim 1 wherein the image sensor determines position information for at least two reference targets on the workpiece.

3. The laser machine tool of claim 1 wherein said machine tool is adapted for any one or any combination of cutting, marking or welding.

4. The laser machine tool of claim 1 wherein said machine tool has at least three mutually perpendicular servo controlled axes, one of the axes being adjusted to establish the focus of the image sensor, at least one other axis being adjusted to position the image sensor over targets on the workpiece.

5. The laser machine tool of claim 2 wherein said image sensor determines the position of the at least two targets on the workpiece and wherein the image sensor sends information on the position of said targets to a computer of the computer controlled laser machine tool which responds by determining position errors and adjusting a reference coordinate system of said workhead guidance system to correct for said position errors.

6. The laser machine tool of claim 5 wherein the image sensor is adapted to check and maintain registration of a workhead guidance system relative to said workpiece when said workpiece is indexed through the work zone a plurality of indexes.

7. The laser machine tool of claim 1 wherein the image sensor is adapted to check and maintain registration of a workhead guidance system relative to said workpiece when said workpiece is indexed through the work zone a plurality of indexes.

8. A computer controlled laser machine tool adapted for any one of or any combination of cutting marking or welding a workpiece, said laser machine tool having a workhead, said laser machine tool having a work zone smaller than the workpiece processed such that said workpiece is indexed through the work zone for processing, and comprising in combination:
    said laser machine tool having an indexable work support for carrying the workpiece;
    said machine tool having an image sensor mounted to image targets on the workpiece;
    said image sensor used to check and maintain registration of a workhead guidance system relative to said workpiece when said workpiece is indexed through said work zone, said image sensor checking registration of said workpiece without requiring holes to be cut into the workpiece; and
    said image sensor checking registration of said workpiece by measuring positions of at least two targets on said workpiece before and after the workpiece is indexed through the work zone.

9. The laser machine tool of claim 8 wherein the image sensor sends data on the position of said at least two targets to a computer of the computer controlled laser machine tool which responds by determining position errors, said position errors used to adjust a reference coordinate system of said workhead guidance system to correct for said position errors.

10. The laser machine tool of claim 8 wherein said machine tool has at least three mutually perpendicular servo controlled axes.

11. The laser machine tool of claim 8 wherein said targets are etched into the surface of said workpiece by said laser machine tool.

12. The laser machine tool of claim 8 wherein said targets are affixed to the surface of said workpiece.

13. The laser machine tool of claim 8 wherein the said targets are affixed to the surface of said workpiece relative to registration marks etched into said workpiece by said laser machine tool.

14. The laser machine tool of claim 8 wherein said image sensor has integrated measurement tools capable of determining the center of a plurality of target shapes.

15. The laser machine tool of claim 8 wherein said machine tool includes an apparatus to blow residue off of said target prior to capturing an image of said target.

16. The laser machine tool of claim 8 wherein corrections of measured workhead to workpiece registration errors are made by rotating and/or shifting the reference coordinate system.

17. The laser machine tool of claim 8 wherein said targets are printed having a symmetrical, non-reflective, target image on a contrasting background and are adhesive backed.

18. The laser machine tool of claim 8 wherein said targets are printed having a symmetrical, non-reflective, target image on a contrasting background and are magnetic.

19. The laser machine tool of claim 8 wherein said image sensor is mounted on said workhead, said workhead having a servo controlled axis that drives a cutting head and a nozzle along a Z-axis, said cutting head having a control apparatus to automatically control the nozzle-to-workpiece standoff distance and to automatically set the image sensor lens-to-workpiece working distance such that the image sensor is automatically focused.

20. The laser machine tool of claim 8 wherein said image sensor is mounted in a housing, said housing being mounted on said workhead, said housing having a lens and a nozzle mounted proximate to said lens to provide a shield gas flow to keep said lens clean.

21. The laser machine tool of claim 8 wherein said image sensor is mounted in a housing, said housing mounted on said workhead, said housing having a lens, said lens provided with a shutter to keep said lens clean.

22. The laser machine tool of claim 21 wherein said shutter is driven via a rotary solenoid.

23. The laser machine tool of claim 21 wherein said shutter is driven via a pneumatic actuator.

24. A computer controlled laser machine tool adapted for cutting and marking a workpiece, said laser machine tool having a workhead, said laser machine tool having a work zone smaller than the workpiece processed such that said workpiece is indexed through said work zone for processing, said laser machine tool having an indexable work support carrying a workpiece, and comprising in combination:
said machine tool having an image sensor positioned to image a target on the workpiece;
said image sensor mounted on said workhead, said workhead having a servo controlled axis that drives a cutting head and a nozzle along a Z-axis, said cutting head adapted with a control apparatus to automatically control a nozzle to workpiece standoff distance and to automatically set an image sensor lens to workpiece working distance such that the image sensor is automatically focused;
said image sensor used to check and maintain registration of a workhead guidance system relative to said workpiece when said workpiece is indexed through said work zone, said image sensor checking registration of said workpiece without requiring holes to be cut into the workpiece;
said image sensor checking registration of said workpiece by measuring positions of two targets on said workpiece before and after the workpiece is indexed through the work zone;
said image sensor producing target position information as a result of checking registration, a computer of said computer controlled laser machine tool operating on said target position information to determine position errors;
the computer of said computer controlled machine tool using said position errors to produce corrections; and
wherein said corrections of determined position errors are made by rotating and/or shifting a reference coordinate system.

25. The laser machine tool of claim 24 wherein said machine tool has at least three mutually perpendicular servo controlled axes.

26. The laser machine tool of claim 24 wherein said targets are etched into the surface of said workpiece by said laser machine tool.

27. The laser machine tool of claim 24 wherein said targets are affixed to the surface of said workpiece.

28. The laser machine tool of claim 24 wherein the said targets are affixed to the surface of said workpiece relative to registration marks etched into said workpiece by said laser machine tool.

29. The laser machine tool of claim 24 wherein said machine tool includes an apparatus to blow residue off of said target prior to capturing an image of said target.

30. The laser machine tool of claim 24 wherein said image sensor has integrated measurement tools capable of determining the center of a plurality of target shapes.

31. The laser machine tool of claim 24 wherein said targets are printed having a symmetrical, non-reflective, target image on a contrasting background and are adhesive backed.

32. The laser machine tool of claim 24 wherein said targets are printed having a symmetrical, non-reflective, target image on a contrasting background and are magnetic.

33. The laser machine tool of claim 24 wherein said image sensor is mounted in a housing, said housing being mounted on said workhead, said housing having a lens and a nozzle mounted proximate to said lens to provide a shield gas flow to keep said lens clean.

34. The laser machine tool of claim 24 wherein said image sensor is mounted in a housing, said housing being mounted on said workhead, said housing having a lens and said lens having a shutter to keep said lens clean.

35. The laser machine tool of claim 34 wherein said shutter is driven via a rotary solenoid.

36. The laser machine tool of claim 34 wherein said shutter is driven via a pneumatic actuator.

37. The laser machine tool of claim 24 wherein registration of workhead to workpiece is checked comparing with set error limits.

38. A computer controlled laser machine tool adapted for any one of or any combination of cutting marking or welding a workpiece, said laser machine tool having a workhead, said laser machine tool having a work zone smaller than the workpiece processed such that said workpiece is indexed through the work zone for processing and comprising in combination:
said laser machine tool having an indexable work support configured for carrying a workpiece;
said machine tool having an image sensor mounted to focus on a target on the workpiece;
said image sensor configured to check and maintain registration of a workhead guidance system relative to said workpiece when said workpiece is indexed through said work zone; and
said image sensor checking registration of said workpiece without requiring holes to be cut into the workpiece.

39. A method of maintaining registration of a workhead guidance system in a computer controlled laser machine tool without requiring holes to be cut into a workpiece, the laser machine tool having a workhead operable over a work zone smaller than the workpiece processed such that the workpiece is indexed through the work zone for processing, the method comprising in combination:

providing the workhead with an image sensor mounted to image a target on the workpiece;

utilizing the image sensor to image at least two targets on the workpiece when the workpiece is in a first position and store target position information in computer memory, after indexing the workpiece using the image sensor to image said at least two targets and store post index target information in computer memory;

utilizing the target position information to determine position errors; and using the determined position error information to adjust registration of the workhead guidance system relative to the workpiece thereby to maintain registration.

* * * * *